May 14, 1968  J. F. COPLIN  3,383,074
VTOL AIRCRAFT

Filed June 3, 1966  3 Sheets-Sheet 3

Inventor
JOHN FREDERICK COPLIN

By *Mackenney & Mackenney*

Attorney

United States Patent Office 3,383,074
Patented May 14, 1968

3,383,074
VTOL AIRCRAFT
John Frederick Coplin, Derby, England, assignor to Rolls-Royce Limited, Derby, England, a British company
Filed June 3, 1966, Ser. No. 557,338
Claims priority, application Great Britain, June 14, 1965, 25,121/65
14 Claims. (Cl. 244—55)

ABSTRACT OF THE DISCLOSURE

The disclosure of this invention pertains to an aircraft having at least one main engine for producing horizontal flight and at least one fan driven by the exhaust gases from said main engine mounted for movement between an inoperative position within the fuselage of the aircraft and a further position in which it is at least partly disposed externally of the aircraft, each fan being pivoted about a horizontal axis between a first position in which the fan produces lift forces on the aircraft independently of those produced by the aerodynamic surfaces of the aircraft during forward flight and a second position in which the thrust produced by the fan has a rearward horizontally directed component to assist in the forward horizontal flight of the aircraft or has a forward horizontally directed component to effect braking of the aircraft.

---

Figure 1:
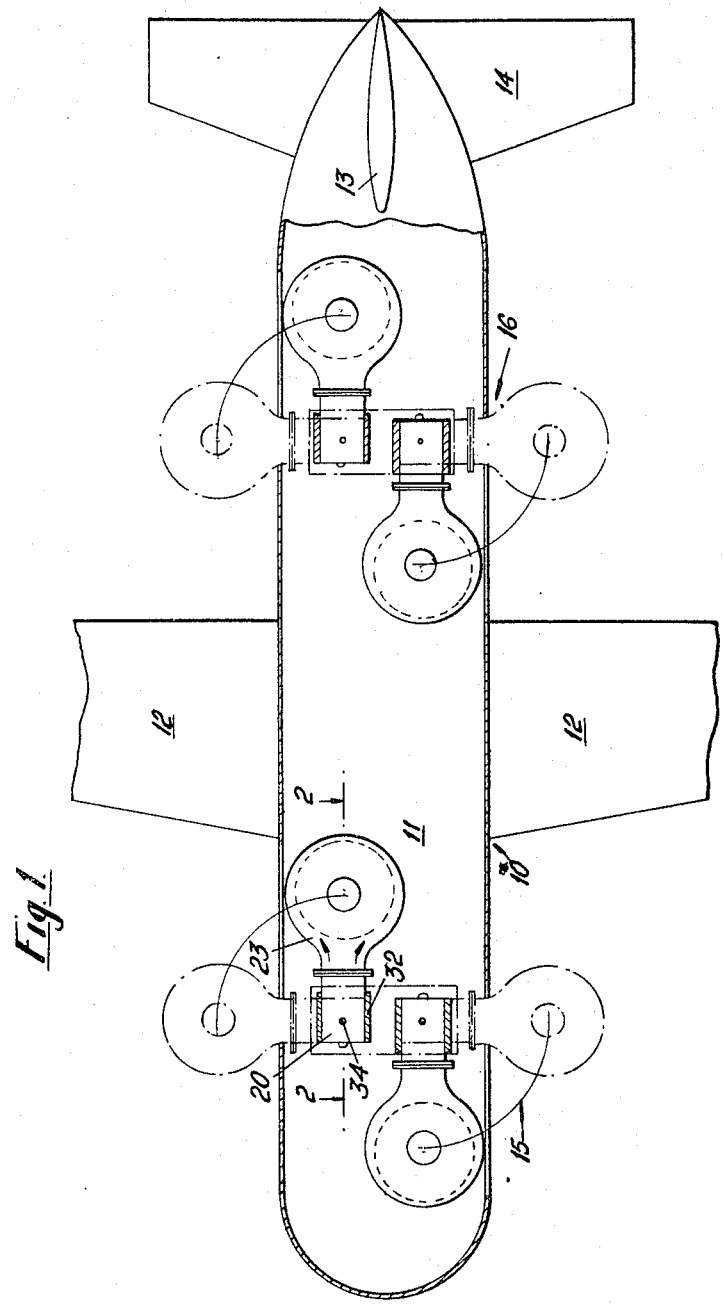

This invention concerns an aircraft and is an improvement in or modification of the invention disclosed and claimed in our Patent No. 1,009,269.

According to the present invention, there is provided an aircraft having at least one propulsion unit comprising at least one gas turbine jet engine and at least one fan driven by the exhaust gases from said engine or engines and mounted to form an integral unit therewith, the or each said unit having means mounting it which are mounted for movement between a position in which it is disposed within the fuselage of the aircraft and a further position in which it is at least partly disposed externally of the aircraft and the or each said unit being pivotable in said mounting means about a substantially horizontal axis between a first position in which the or each fan produces lift forces on the aircraft independently of those produced by the aerodynamic surfaces of the aircraft during forward flight thereof and a second position in which the thrust produced by the or each fan has a horizontally directed component.

The arrangement may be such that the thrust produced by the or each fan can be directed rearwardly of the aircraft, whereby transition of the aircraft from vertical to forward flight may be effected.

The arrangement may also be such that the *th*rust produced by the or each fan can be directed forwardly of the aircraft to effect braking thereof.

The or each said engine may be mounted either vertically or horizontally. In the latter case, the or each engine may be mounted within a bearing for pivotal movement about its longitudinal axis. Thus the or each unit may be pivotally mounted about a substantially vertical axis for pivotal movement in a substantially horizontal plane between said position and further position. The or each engine may, for example, be rotatably supported, with its axis substantially horizontal, on a pedestal which is itself pivotally mounted on the fuselage of the aircraft about a substantially vertical pivot.

In one embodiment, the or each unit is pivotable through 90° from a position in which the longitudinal axis of the or each engine is parallel to the longitudinal axis of the aircraft to said further position, in which the longitudinal axis of the or each engine is normal to the longitudinal axis of the aircraft.

The aircraft may be provided with at least one pair of said units mounted on said aircraft, the engines of said pair of units being pivoted at axially aligned points on said fuselage and facing in opposite direction when disposed in said fuselage. Thus the aircraft may have two pairs of such units.

The or each fan is preferably shrouded by an annular volute which communicates with the exhaust duct from the or each said engine to receive exhaust gases therefrom, the exhaust gases being directed from said volute onto the blades of an axial flow turbine drivingly connected to said fan. Thus the blades of the or each turbine may be mounted on the radially outer end of the blades of the respective fan.

The fan may also be provided with inlet guide vanes and outlet guide vanes mounted upstream and downstream respectively of the fan within said volute.

The or each fan is preferably provided with blades the work done by which at any point thereon being directly proportional to the radius of said point.

In one embodiment of the invention, the or each unit is provided with a plurality of engines whose exhaust gases are directed into a plenum chamber, the or each unit comprising a plurality of fans driven by the exhaust gases from the plenum chamber.

Figure 2:
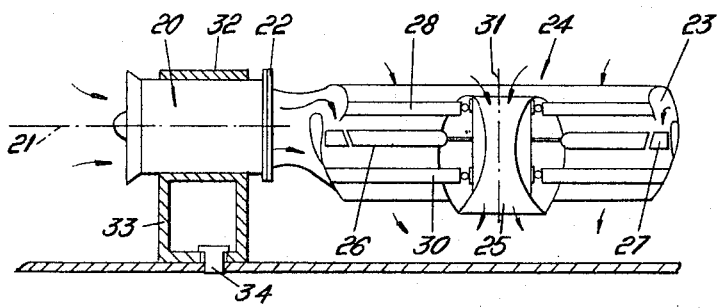
Figure 4:
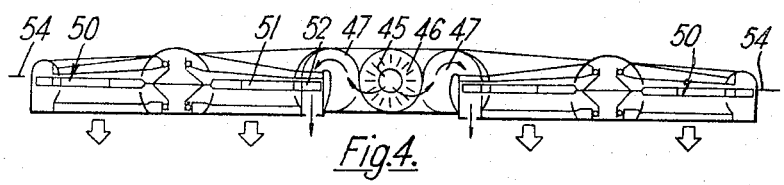
Figure 5:
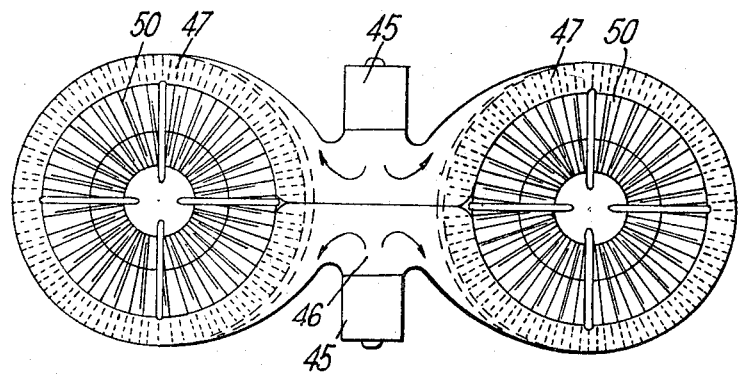
Figure 3:
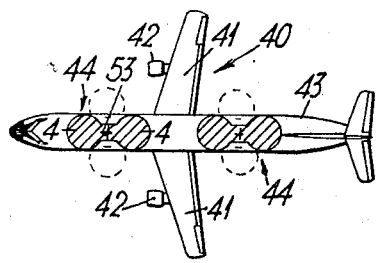

The invention is illustrated, merely by way of example, in the accompanying drawings, in which:

FIGURE 1 is a diagrammatic plan view, partly in section, of an embodiment of an aircraft according to the present invention, FIGURE 2 is a part-sectional elevation of part of the aircraft of FIGURE 1 taken on line 2—2 of FIGURE 1, FIGURE 3 is a diagrammatic plan view, partly in section, of another embodiment of an aircraft according to the invention, FIGURE 4 is a diagrammatic section taken on the line 4—4 of FIGURE 3, and FIGURE 5 is an underneath plan view of the structure shown in FIGURE 4.

Referring first to FIGURES 1 and 2, there is shown an aircraft 10 comprising a fuselage 11, wings 12, fin 13 and tail plane 14. The aircraft is provided with two forward propulsion engines (not shown) and four additional propulsion units arranged in two pairs 15, 16. All four additional propulsion units are identical and therefore one only will be described.

Referring to FIGURE 2, one of the propulsion units is shown in more detail and is seen to comprise an axial flow gas turbine jet engine 20 mounted with its longitudinal axis 21 substantially horizontal. Attached at 22 to the downstream end of engine 20 to form an integral unit therewith is an annular volute 23 within which there is disposed an axial flow fan indicated generally at 24. The fan 24 comprises a central hollow hub 25 on which there is rotatably mounted a plurality of angularly spaced apart axial flow fan blades 26. Mounted on the radially outer end of each fan blade 26 is a turbine blade 27 of an axial flow turbine fed with exhaust gases from the annular volute 23, the latter communicating with the exhaust duct of the engine 20. Mounted upstream of the fan blades 26 is a set of inlet guide vanes 28. Mounted downstream of the fan blades 26 is a set of outlet guide vanes 30. As seen in FIGURES 1 and 2, the longitudinal axis of symmetry 31 of the fan 24 is disposed at 90° to the axis 21 of the engine 20.

The engine 20 is rotatably mounted within a bearing 32 supported on a pedestal 33 which is itself pivotally mounted to the aircraft fuselage 11 by a substantially vertical pivot 34.

The additional propulsion units are shown in full lines in FIGURE 1 in their inoperative positions in which they are disposed within the fuselage 11 of the aircraft with the longitudinal axes 21 of the engines 20 parallel with the longitudinal axis of the aircraft and substantially horizontal. The intakes of the engines 20 of each pair of units face in opposite directions. In this way the volutes 23 of the fans of adjacent units do not occupy much transverse space, since these volutes can overlap.

When the additional propulsion units are to be used, the units are pivoted (by means not shown) about the pivots 34 in a substantially horizontal plane from the position shown in full lines in FIGURE 1 to the further position shown in broken lines in FIGURE 1, such that the longitudinal axes 21 of engines 20 move from the position in which they are parallel to the longitudinal axis of the aircraft 11 to a position in which their axes are normal to the axis of the aircraft. In this further position the additional propulsion units are partly disposed externally of the aircraft.

In this further position, moreover, the fans 24 may provide lift forces on the aircraft independently of those produced by the aerodynamic surfaces of the aircraft during forward flight thereof, since the axes 31 of the fans 24 are disposed vertically. When the aircraft has reached sufficient height and the transition from vertical to forward flight is required, means (not shown) are actuated to rotate the additional propulsion units about the axes 21 of the engines 20, whereby the thrust produced by the fans 24 can be directed rearwardly of the aircraft. Alternatively, should it be desired to effect braking of the aircraft, the additional propulsion units can again be rotated about the axes 21 of engines 20 such as to direct the thrust forces from the fans 24 forwardly of the aircraft.

When the additional propulsion units are no longer needed for vertical or short take-off or landing, they are returned to the full line positions shown in FIGURE 1 in which they are disposed within the fuselage of the aircraft and thereby reduce drag on the aircraft. Forward propulsion of the aircraft is then provided by the forward propulsion engines (not shown).

Although in the embodiment described above each additional propulsion unit comprises a fan driven by a single engine, each unit may include two or more engines driving one or more fans. With such an arrangement, failure of one engine of a unit will not result in total power loss from that particular unit.

It will be appreciated that, by providing the engines and fans of the additional propulsion units as integral units such that they pivot together between operative and inoperative positions, there is no need to provide ducting connecting the engines with the fans to accommodate relative pivotal movement therebetween.

The inlet guide vanes 28 and the outlet guide vanes 30 can be suitably pivoted about their longitudinal axes to alter the operating characteristics of the fans 24 to provide the thrust requirements of the aircraft, thus obviating the necessity to throttle the engines 20 to vary the thrust provided by the additional units.

It will be appreciated that a tip driven fan need not be employed in the additional propulsion units but that any suitable fan may be used. It will also be appreciated that four such additional units need not be used on the aircraft, any number being available to suit particular requirements.

In the embodiment of the invention shown in FIGURES 3 to 5, an aircraft 40 has wings 41 which are provided with forward propulsion gas turbine jet engines 42, and a fuselage 43 in which are mounted two additional propulsion units 44 which are longitudinally spaced apart and arranged on opposite sides of the wings 41.

Each of the units 44 is an integral unit comprising two horizontally disposed back to back gas turbine jet engines 45 whose exhaust gases are directed into a common plenum chamber 46.

The plenum chamber of each unit 44 communicates with two annular volutes 47 each of which shrouds a fan 50. Each fan 50 has blades 51 at whose radially outer ends there are mounted axial flow turbine blades 52 which are disposed in the respective annular volute 47. The fans 50 are thus driven by the exhaust gases from the respective engines 45.

The fan blades 51 are desirably of the kind in which the work done at any point thereon is directly proportional to the radius of said point, whereby an acceptable fan blade root loading may be achieved. If desired, the turbine driving the fan blades may be a two stage tip turbine.

Each unit 44 is pivotally mounted both about a vertical axis 53 and an horizontal axis 54 and may be moved about both said axes by means not shown. Thus each unit 44 may be moved from the full line position shown in FIGURE 3, in which it is disposed wholly within the fuselage 43, and the dotted line position shown in FIGURE 3, in which it is partly disposed externally of the fuselage 43. When in the latter position, each unit 44 may be pivoted, about the axis 54, between the position shown in FIGURE 4, in which the fan efflux is downwardly directed, and other positions (not shown) in which the fan efflux has an horizontally directed component to permit braking of the aircraft or to assist the transition from vertical to forward flight.

If desired, the engines 45, instead of being horizontally mounted as shown, may be vertically disposed.

I claim:

1. An aircraft having at least one propulsion unit comprising at least one gas turbine jet engine and at least one fan driven by the exhaust gases from said engine and mounted to form an integral unit therewith, the said unit having means mounting it for movement between a position in which it is disposed within the fuselage of the aircraft and a further position in which it is at least partly disposed externally of the aircraft, and the said unit being pivotable in said mounting means about a substantially horizontal axis between a first position in which the fan produces lift forces on the aircraft independently of those produced by the aerodynamic surfaces of the aircraft during forward flight thereof, and a second position in which the thrust produced by the fan has a horizontally directed component.

2. An aircraft as claimed in claim 1 in which the fan is movable to direct the thust thereof rearwardly of the aircraft, whereby transition of the aircraft from vertical to forward flight may be effected.

3. An aircraft as claimed in claim 1 in which the fan is movable to direct the thrust thereof forwardly of the aircraft to effect braking thereof.

4. An aircraft as claimed in claim 1 in which the said engine is mounted horizontally.

5. An aircraft as claimed in claim 4 wherein the said engine is mounted within a bearing for pivotal movement about its longitudinal axis.

6. An aircraft as claimed in claim 4 wherein the said unit is pivotally mounted about a substantially vertical axis for pivotal movement in a substantially horizontal plane between said position and said further position.

7. An aircraft as claimed in claim 6 wherein there is a pedestal on which the said engine is rotatably supported, with its axis substantially horizontal, the pedestal being pivotally mounted on the fuselage of the aircraft about a substantially vertical pivot.

8. An aircraft as claimed in claim 6 wherein the said unit is pivotable through 90° from a position in which the longitudinal axis of the engine is parallel to the longitudinal axis of the aircraft to said further position, in which the longitudinal axis of the engine is normal to the longitudinal axis of the aircraft.

9. An aircraft as claimed in claim 6 comprising at least one pair of said units mounted on said aircraft, the engines of said pair of units being pivoted at axially aligned points on said fuselage and facing in opposite directions when disposed in said fuselage.

10. An aircraft as claimed in claim 9 comprising two pairs of units.

11. An aircraft as claimed in claim 1 wherein an annular volute shrouds the fan and communicates with the said engine to receive exhaust gases therefrom, and an axial flow turbine is drivingly connected to said fan, the blades of said turbine being disposed in the volute.

12. An aircraft as claimed in claim 11 wherein the blades of the said turbine are mounted on the radially outer ends of the blades of the said fan.

13. An aircraft as claimed in claim 11 wherein the said fan is also provided with inlet guide vanes and outlet guide vanes mounted upstream and downstream respectively of said fan within said volute.

14. An aircraft as claimed in claim 1 in which the unit is provided with a plurality of engines and there is a plenum chamber which receives the exhaust gases therefrom, the unit comprising a plurality of fans driven by the exhaust gases from the plenum chamber.

References Cited

UNITED STATES PATENTS

| | | | |
|---|---|---|---|
| 3,033,492 | 5/1962 | Rowe | 244—52 X |
| 3,302,907 | 2/1967 | Wilde et al. | 244—55 |

FERGUS S. MIDDLETON, *Primary Examiner.*

MILTON BUCHLER, *Examiner.*

B. BELKIN, *Assistant Examiner.*